US011595434B2

(12) United States Patent
Zegeye et al.

(10) Patent No.: US 11,595,434 B2
(45) Date of Patent: Feb. 28, 2023

(54) METHOD AND SYSTEM FOR INTRUSION DETECTION

(71) Applicant: Morgan State University, Baltimore, MD (US)

(72) Inventors: Wondimu K. Zegeye, Baltimore, MD (US); Richard A. Dean, Baltimore, MD (US); Farzad Moazzami, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 271 days.

(21) Appl. No.: 16/887,127

(22) Filed: May 29, 2020

(65) Prior Publication Data

US 2021/0185086 A1    Jun. 17, 2021

Related U.S. Application Data

(60) Provisional application No. 62/854,512, filed on May 30, 2019.

(51) Int. Cl.
*H04L 9/40* (2022.01)
*G06K 9/62* (2022.01)
(52) U.S. Cl.
CPC .......... *H04L 63/1466* (2013.01); *G06K 9/623* (2013.01); *G06K 9/6218* (2013.01);
(Continued)
(58) Field of Classification Search
None
See application file for complete search history.

(56) References Cited

U.S. PATENT DOCUMENTS 7,660,707 B2    2/2010    Maruyama et al.
7,698,740 B2    4/2010    Oka et al.
(Continued)

FOREIGN PATENT DOCUMENTS

CN    103810473 A  *  5/2014
CN    106961444 A  *  7/2017    ........... H04L 41/145
(Continued)

OTHER PUBLICATIONS

Larue et al., Modified k-means clustering method of HMM states for initialization of Baum-Welch training algorithm, 19th European Signal Processing Conference, pp. 951-955 (Year: 2011).*

(Continued)

*Primary Examiner* — Mohammed Rachedine
(74) *Attorney, Agent, or Firm* — Whiteford, Taylor & Preston, LLP; Gregory M. Stone

(57) ABSTRACT

Disclosed herein are methods and systems that apply a multi-layer Hidden Markov Model (HMM) for intrusion detection. The methods and systems employ a dimension reduction technique to extract only important features from network packet data and apply a decomposition algorithm to lower levels of data to construct lower level HMMs (representing partial solutions), which lower level HMMs are then combined to form a final, global solution. The multi-layer approach can be expanded beyond the exemplary case of 2 layers in order to capture multi-phase attacks over longer spans of time. A pyramid of HMMs can resolve disparate digital events and signatures across protocols and platforms to actionable information where lower layers identify discrete events (such as network scan) and higher layers identify new states which are the result of multi-phase events of the lower layers.

14 Claims, 6 Drawing Sheets

(52) U.S. Cl.
CPC ......... *G06K 9/6277* (2013.01); *G06K 9/6297* (2013.01); *H04L 63/1408* (2013.01); *H04L 63/20* (2013.01)

(56) References Cited

U.S. PATENT DOCUMENTS

| | | | |
|---|---|---|---|
| 9,870,470 | B2 | 1/2018 | Herwono et al. |
| 10,185,832 | B2 | 1/2019 | Cam |
| 10,296,847 | B1 | 5/2019 | Do et al. |
| 2017/0142144 | A1* | 5/2017 | Weinberger ......... H04L 63/1408 |
| 2017/0257388 | A1* | 9/2017 | Addepalli ............... G06N 20/00 |
| 2018/0287901 | A1* | 10/2018 | Bisada ................ H04L 41/0631 |
| 2018/0307833 | A1* | 10/2018 | Noeth ................... H04L 43/062 |
| 2019/0261222 | A1* | 8/2019 | Raleigh ................ H04W 28/10 |

FOREIGN PATENT DOCUMENTS

| | | | | |
|---|---|---|---|---|
| CN | 108234430 | A | * 6/2018 | ......... H04L 63/1425 |
| CN | 106294344 | B | * 6/2019 | ............. G06F 16/35 |
| WO | WO 2017019103 | A | * 2/2017 | |

OTHER PUBLICATIONS

Zegeye et al., Multi-Layer Hidden Markov Model Based Intrusion Detection System, Machine Learning & Knowledge Extraction, Dec. 25, 2018, pp. 265-286, Issue Date Jan. 2019.

Lee, D. H., et al. "Multi-Stage Intrusion Detection Using Hidden Markov Model Algorithm," 2008 International Conference on Information Science and Security (ICISS 2008), Seoul, Jan. 2008.

Ourston, D., et al. "Applications of hidden Markov models to detecting multi-stage network attacks," 36th Annual Hawaii International Conference on System Sciences, Jan. 2003.

* cited by examiner

METHOD AND SYSTEM FOR INTRUSION DETECTION

CROSS REFERENCE TO RELATED APPLICATIONS

This application is based upon and claims the benefit of U.S. Provisional Application No. 62/854,512 titled "Multi-Layer Hidden Markov Model Based Intrusion Detection System," filed with the United States Patent & Trademark Office on May 30, 2019, the specification of which is incorporated herein by reference in its entirety.

FIELD OF THE INVENTION

This invention relates generally to computer network security, and more particularly to methods and systems for monitoring data network traffic to detect and respond to unauthorized intrusions into a data network.

BACKGROUND OF THE INVENTION

Intrusion Detection Systems have been the subject of significant research both in academia and industry in the past few decades as the interest in information security has been growing rapidly. The National Institute of Standards and Technology (NIST) defines intrusion detection as "the process of monitoring the events occurring in a computer system or network and analyzing them for signs of intrusions, defined as attempts to compromise the confidentiality, integrity, availability, or to bypass the security mechanisms of a computer or network." A system which addresses or automates intrusion detection is referred as an "Intrusion Detection System" ("IDS").

Intrusion detection systems come in different forms. Based on their points of placement, they can be categorized into network-based intrusion detection system (NIDS) and host-based intrusion detection system (HIDS). A network intrusion detection system (NIDS) is placed at a strategic point in the network such that packets traversing a particular network link can be monitored. NIDSs monitor a given network interface by placing it in promiscuous mode. This will help the IDS in hiding its existence from network attackers while performing the task of network traffic monitoring. On the other hand, Host-based IDSs monitor and reside in individual host machines. HIDSs operate by monitoring and analyzing the host system internals such as operating system calls and file systems. In the same way as NIDS, it can also monitor the network interface of the host.

The techniques employed by modern day IDSs to gather and analyze data are extremely diverse. However, those techniques have common basic features in their structures: a detection module which collects data that possibly contain evidence of intrusion and an analysis engine that processes this data to identify intrusive activity. Those analysis engines mainly use two techniques of analysis: anomaly detection and misuse detection.

The intrinsic nature of misuse detection revolves around the use of expert systems that are capable of identifying intrusions mainly based on a preordained knowledge base. Consequently, misuse structures are able to reach very high levels of accuracy in identifying even very subtle intrusions which might be represented in their knowledge base; similarly, if this expert knowledge base is developed carefully, misuse systems produce a minimum number of false positives. Unfortunately, however, carry a disadvantage due to the fact that a misuse detection system is incapable of detecting intrusions that are not represented in its knowledge base. Subtle versions of known attacks may additionally affect the evaluation if a misuse system is not well-constructed. Therefore, the efficiency of the system is highly dependent on the thorough and accurate creation of this information base, an undertaking that calls for human expertise involvement and, thus, the need to develop anomaly detection methods.

A wide variety of strategies have also been explored to detect anomalous events from normal ones, including neural networks, statistical modeling and Hidden Markov Models ("HMMs") to name a few. Those approaches rely on the same principle. At first, a baseline model that is a representative of normal system behavior against which anomalous events can be distinguished is established. When an event indicates anomalous activity, as compared with the baseline, it is considered as malicious. This system characterization can be used to identify anomalous traffic from normal traffic.

One of the very attractive features of anomaly-based intrusion detection systems is their capability to identify previously unseen attacks. The baseline model in this case is usually automated and it does not require both human interference and the knowledge base. The aftermath of this approach is that the detection system may fail to detect even well-known attacks if they are crafted not to be substantially different from the normal behavior established by the system.

Currently, more than fifty percent of web traffic is encrypted—both normal and malicious. The volume of encrypted traffic is expanding even more, which creates confusion and challenges for security teams trying to monitor and identify malicious network traffic. The main goal of encryption is to enhance network security, but at the same time it provides intruders the power to hide command-and-control (C2) activity, giving them enough time to launch attacks and to cause damage. To keep up with the intruders, security teams need to include additional automation and modern tools that are developed using machine learning and artificial intelligence to supplement threat detection, prevention and remediation.

More enterprises are now exploring the fields of machine learning and artificial intelligence to prevail over the effect of encryption and to decrease adversaries' time. These advanced concepts have the capability to keep up their performance without humans having to clarify precisely the way to accomplish the tasks that they are provided. Unusual patterns of web traffic that can indicate malicious activity can be automatically detected as these advanced systems, which can, overtime, "learn" by themselves.

To automatically detect "known-known" threats, the types of attacks that have been known previously, machine learning plays a significant role. But its main advantage in monitoring encrypted web traffic is due to the fact that it is capable of detecting "known-unknown" threats (previously unknown distinct form of known threats, malware subdivision, or similar new threats) and "unknown-unknown" (net-new malware) threats. Those technologies automatically alert potential attacks to network administrators as they can learn to identify unusual patterns in massive volumes of encrypted web traffic. Those automatic alerts are very important in organizations where there is a lack of knowledgeable personnel in the enhancement of security defenses. Intelligent and automated tools using machine learning and artificial intelligence can help security teams fill the gaps in skills and resources, making them more capable in recognizing and responding to both well-known and prominent threats.

Several techniques of artificial intelligence (AI) have been explored in the path towards developing IDSs, such as fuzzy logic, artificial neural networks (ANNs), and genetic algorithms (GA). In addition, hybrid intelligent IDSs, such as evolutionary neural networks (ENN) and evolutionary fuzzy neural networks (EFuNN)—based IDSs, are also used.

The current implementations of HMMs for IDS are mainly based on a single HMM, which will be trained for any incoming network traffic to identify anomalous and normal traffic during testing.

Other HMM based IDS implementations rely on multi HMM profiles where each of the HMMs are trained for a specific application type traffic and posterior probabilities are used to select network applications using only packet-level information that remain unchanged and observable after encryption, such as packet size and packet arrival time. This approach, even if it includes factors based on application layer traffic, considers only a limited number of features and is unable to detect multistage attacks, which can be crafted to look like normal traffic. Further, other prior methods have applied several pre-processing techniques on the dataset considered to implement a multi-class system (MCS) HMM-based IDS.

HMMs use statistical learning algorithms that suffer in cost exponentially as the volume of data grows. This aspect is commonly referred as the curse of dimensionality. The HMMs tend to fail, more often than not, on a large dimension state space. Considering a single HMM-based IDS, as the incoming network traffic will have a large hidden state space, it will fall victim to this curse of dimensionality.

Thus, there remains a need in the art for methods and systems for implementing IDSs, and in particular HMM-based IDSs, that avoid foregoing disadvantages of such systems but that ensure the capability of detecting a wide variety of intrusion types over extended periods of time.

SUMMARY OF THE INVENTION

Disclosed herein are methods and system that apply the Hidden Markov Model (HMM) for intrusion detection, which are capable of providing finer-grained characterization of network traffic using a multi-layer approach. In addition to providing a multi-layer HMM design capable of detecting multi-stage attacks, an IDS data analysis method and system as disclosed herein uses several features in which a dimension reduction technique is applied to extract only important features. Methods and systems configured in accordance with at least certain aspects of the invention address the complexities of prior known systems through application of the principle of decomposition, and more particularly applying a decomposition algorithm to lower levels of data to construct lower level HMMs (representing partial solutions), which lower level HMMs are then combined to form a final, global solution.

Such a multi-layer approach as is employed in the methods and systems disclosed herein has been developed and verified to resolve the common flaws in the application of HMM to IDS commonly referred to as the "curse of dimensionality." It factors a huge problem of immense dimensionality to a discrete set of manageable and reliable elements. The multi-layer approach can be expanded beyond the exemplary case of 2 layers discussed below in order to capture multi-phase attacks over longer spans of time. A pyramid of HMMs can resolve disparate digital events and signatures across protocols and platforms into actionable information where lower layers identify discrete events (such as network scan) and higher layers identify new states which are the result of multi-phase events of the lower layers.

In accordance with certain aspects of an embodiment, a method is provided for protecting a computer network against unauthorized intrusion, comprising the steps of: receiving network packet data at a processor of a computer-implemented network traffic monitor module; generating at the processor meaningful Hidden Markov Model ("HMM") observations formatted as data input for one or more first HMMs, the one or more first HMMs forming a first processing layer of HMMs; generating from the first processing layer of HMMs a first probable sequence of network traffic states; processing at the processor the first probable sequence of network traffic states to form a feature vector; processing at the processor the feature vector to generate meaningful HMM observations formatted as data input for a second HMM, the second HMM forming a second processing layer; generating from the second processing layer a second probable sequence of network traffic states; and upon determining that the second probable sequence of network traffic states exhibits a designated probability of a non-normal data traffic state, generating an alert of a likely non-normal data traffic state and transmitting the alert to an administrator.

In accordance with further aspects of an embodiment, a system is provided for protecting a computer network against unauthorized intrusion, comprising: one or more processors; and one or more memories coupled to said one or more processors, wherein the one or more memories are configured to provide the one or more processors with instructions which when executed cause the one or more processors to: receive network packet data; generate meaningful Hidden Markov Model ("HMM") observations formatted as data input for one or more first HMMs, the one or more first HMMs forming a first processing layer of HMMs; generate from the first processing layer of HMMs a first probable sequence of network traffic states; process the first probable sequence of network traffic states to form a feature vector; process the feature vector to generate meaningful HMM observations formatted as data input for a second HMM, the second HMM forming a second processing layer; generate from the second processing layer a second probable sequence of network traffic states; and upon determining that the second probable sequence of network traffic states exhibits a designated probability of a non-normal data traffic state, generate an alert of a likely non-normal data traffic state and transmit the alert to an administrator.

BRIEF DESCRIPTION OF THE DRAWINGS

The numerous advantages of the present invention may be better understood by those skilled in the art by reference to the accompanying drawings in which.

DETAILED DESCRIPTION

Figure 1:
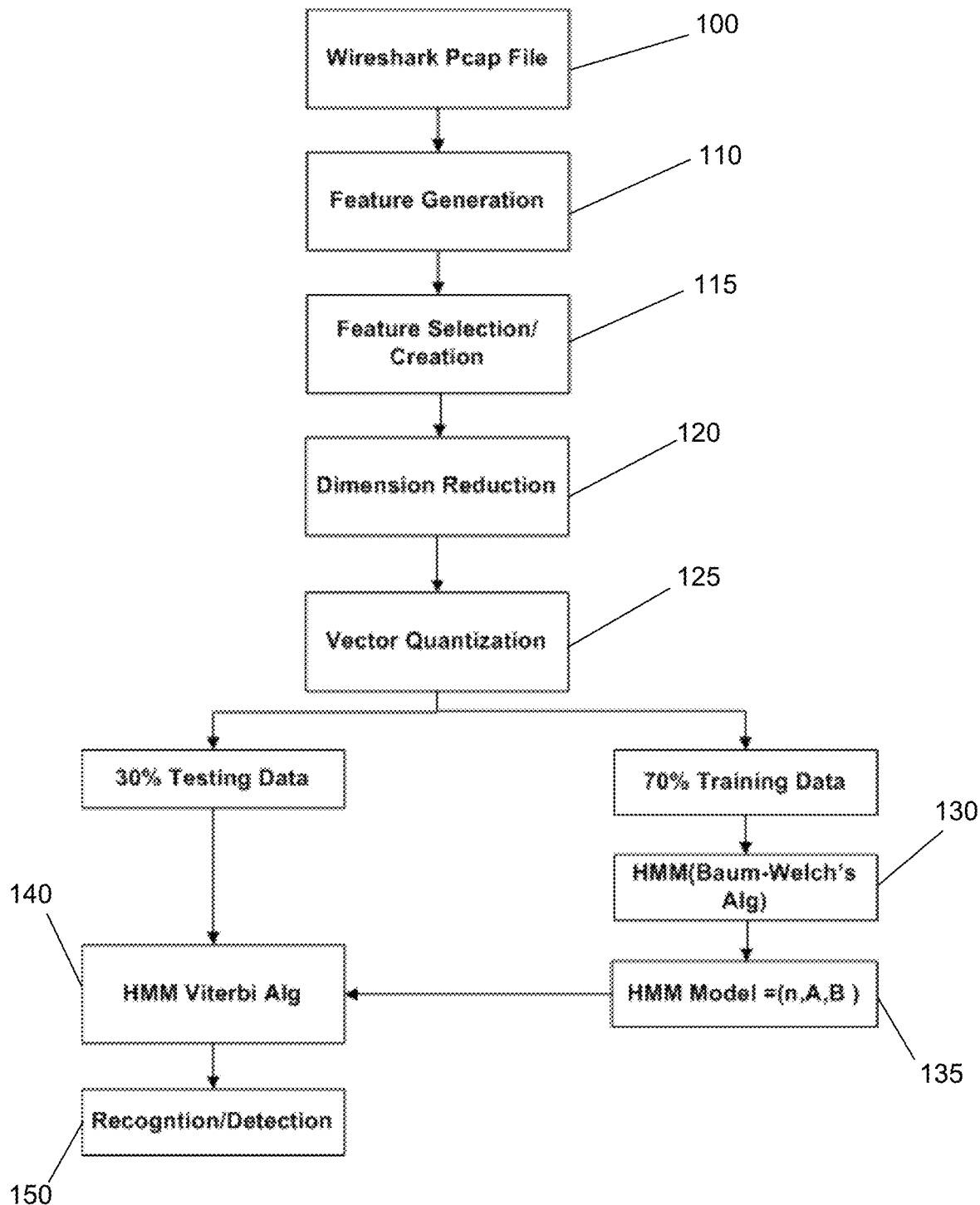
FIG. 1 is a schematic flow chart showing an intrusion detection method configured in accordance with certain aspects of an embodiment of the invention.

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

In accordance with certain aspects of an embodiment of the invention, an intrusion detection method and system is provided that employs a layered analysis of data network traffic to identify multiple forms of attacks over longer durations than previously known intrusion detection systems. Many data network vulnerabilities might be impossible to detect with simple networking traffic monitoring tools. Intrusion detection systems and methods configured in accordance with at least certain aspects of the invention, which rely on machine learning and artificial intelligence, can significantly improve network defense against intruders. Such systems and methods can be trained to learn and identify uncommon patterns in massive volumes of traffic, and notify, using by way of non-limiting example alert flags, a system administrator for additional investigation.

Intrusion detection systems and methods configured in accordance with at least certain aspects of the invention make use of machine learning algorithms, such as Hidden Markov Models ("HMMs"), using a multi-layer approach that is configured to resolve common flaws in the application of HMM to IDS, commonly referred to as the "curse of dimensionality." It factors a huge problem of immense dimensionality to a discrete set of manageable and reliable elements. Such multi-layer approach can be expanded beyond two layers to capture multi-phase attacks over longer periods of time than previously implemented intrusion detection systems. A pyramid of HMMs can resolve disparate digital events and signatures across protocols and platforms to actionable information where lower layers identify discrete events (such as network scan) and higher layers identify new states that are the result of multi-phase events of the lower layers.

A challenge in applying the Markov model to intrusion detection systems is the lack of a standard method for the translation of the observed network packet data into a meaningful Markov model. The first step towards building an IDS based on multiple layers of Hidden Markov Models therefore involves processing network traffic into meaningful observations.

An intrusion detection system and method configured in accordance with certain aspects of the invention is shown in the schematic flow chart of FIG. 1. At step 100, network packet data is captured, such as through use of a network packet analyzer such as WIRESHARK. The captured data is then subjected to a series of data processing steps that serve to create meaningful observations formatted as data input for one or more training data-generating HMMs (i.e., a first layer of HMMs in the multi-layer model set forth herein), which data processing steps include (i) feature generation at step 110, (ii) feature selection among those generated features or creation of new features by combining the generated features at step 115, (iii) using machine learning algorithms for dimension reduction at step 120, and finally (iv) applying vector quantization technique to create meaningful observations for the HMMs at step 125.

In order to evaluate the effectiveness of an IDS configured in accordance with aspects of the invention, the Canadian Institute of Cybersecurity presented a state of the art dataset named CICIDS2017, consisting of the most recent threats and features. A dataset for the intrusion detection systems and methods set forth herein was prepared from this CICIDS2017 dataset, which covers eleven criteria that are necessary in building a reliable benchmark dataset. It contains very common attacks such as XSS, Port scan, Infiltration, Brute Force, SQL Injection, Botnet DoS and DDoS. Those skilled in the art will readily recognize that any other dataset may be substituted without departing from the spirit and scope of the invention, as long as it simulates attacks that are multi-stage in nature.

From the network data packet embodied in the captured data at step 100, an original set of features is generated at step 110 that characterize the data. From that original set of features, feature selection and creation takes place at step 115. Feature selection involves choosing a subset of features from the initial available features, whereas feature creation is a process of constructing new features and is usually performed after the feature selection process. Feature selection takes a subset of features (M) from the original set of features (N) where M<N.

To build a robust and high performance IDS, the features created or constructed at step 115 from the subset of selected features could follow a knowledge-based approach. Other approaches which can be applied to construct new features are data-driven, hypothesis-driven and hybrid.

Features that are discarded may include source port, as source port is part of the categorical encoding that is applied on the following features (Flow_ID, Source_IP, Destination_IP), resulting in numerical values. In addition, a new feature (label) which identifies the traffic type such as BENIGN, SSH-patator and web-attack-bruteforce is added. The values corresponding to this new feature are also categorically encoded.

Dimension reduction at step 120 is a form of transformation whereby a new set of features is extracted. This feature extraction process extracts a set of new features from the initial features through a functional mapping. However, prior to carrying out such feature extraction, normalization is applied to the original data matrix in order to standardize the features of the dataset by giving them equal weights. In doing so, noisy or redundant objects will be removed, resulting in a dataset which is more reliable and viable, which in turn improves accuracy. Normalization can be performed using several methods well known to those skilled in the art, such as Min-Max, Z-Score and Decimal Scaling, to name a few. In a dataset, such as the one discussed herein, where among attributes there is a high degree of variation, the utilization of another type of normalization known as log-normalization may be preferred. The notations and steps for applying this normalization are as follows:

Notation:
$x_{ij}$—the initial value in row i and column j of the data matrix
$b_{ij}$—the adjusted value which replaces $x_{ij}$ The transformation below is a generalized procedure that (a) tends to preserve the original order of magnitudes in the data and (b) results in values of zero when the initial value was zero.

Given:
Min(x) is the smallest non-zero value in the data
Int(x) is a function that truncates x to an integer by dropping digits after decimal point
c=order of magnitude constant=Int(log(Min(x)))
d=decimal constant=$\log^{-1}(c)$
Then the transformation is $$b_{ij}=\log(x_{ij}+d)-c$$

A small number must be added to all data points if the dataset contains zeros before applying the log-transformation. For a data set where the smallest non-zero value is 1, the above transformation will be simplified to $$b_{ij}=\log(x_{ij}+1)$$

Following such normalization process, feature extraction, also known as dimension reduction, is applied at step 120. The goal of dimension reduction is to extract a set of new features through some functional mapping. If we initially have n features (or attributes), $A_1, A_2, \ldots, A_n$, after feature selection and creation at step 115, feature extraction and dimension reduction at step 120 results in a new set of features, $B_1, B_2, \ldots, B_m$ (m<n) where $B_i=F_i(A_1, A_2, \ldots, A_n)$ and $F_i$ is a mapping function.

Principal Components Analysis ("PCA") is a classic technique that is used to compute a linear transformation by mapping data from a high dimensional space to a lower dimension. The original n features are replaced by another set of m features that are computed from a linear combination of these initial features.

PCA is used to compute a linear transformation by mapping data from a high dimensional space to a lower dimension. The first principal component contributes the highest variance in the original dataset and so on. Therefore, in the dimension reduction process, the last few components can be discarded as it only results in minimal loss of the information value. The main goals of PCA are to (i) extract the maximum variation in the data; (ii) reduce the size of the data by keeping only the significant information; (iii) make the representation of the data simple; and (iv) analyze the structure of the variables (features) and observations. PCA provides a framework for minimizing data dimensionality by identifying principal components, linear combinations of variables, which represent the maximum variation in the data. Principal axes linearly fit the original data so the first principal axis minimizes the sum of squares for all observational values and maximally reduces residual variation. Each subsequent principal axis maximally accounts for variation in residual data and acts as the line of best fit directionally orthogonal to previously defined axes. Principal components represent the correlation between variables and the corresponding principal axes. Conceptually, the PCA algorithm fits each axis to the data while conditioning upon all previous axes definitions. Principal components project the original data onto these axes, where these axes are ordered such that Principal Component 1 ($PC_1$) accounts for the most variation, followed by $PC_2, \ldots, PC_p$ for p variables (dimensions).

In accordance with certain aspects of the invention, the PCA procedure that is applied by the method and system described herein preferably applies Singular Value Decomposition ("SVD"), which is numerically more stable than Eigenvalue Decomposition ("EVD") as it avoids the computation of the covariance matrix, which is an expense operation. SVD for PCA may be carried out as follows.

Any matrix X of dimension N×d can be uniquely written as $X=U \times \Sigma \times V^T$
where:
r is the rank of matrix X (i.e., the number of linearly independent vectors in the matrix).
U is a column-orthonormal matrix of dimension N×d.
$\Sigma$ is a diagonal matrix of dimension N×d where $\sigma_i$a, 's (the singular values) are sorted in descending order across the diagonal.
V is a column-orthonormal matrix of dimension d×d.
Given a data matrix X, the PCA computation using SVD is as follows:
For $X^TX$, a rank r (N≥d⇒r≤d), square, symmetric N×N matrix
$\{\hat{v}_1, \hat{v}_2, \ldots, \hat{v}_r\}$ is the set of orthonormal d×1 Eigenvectors with Eigenvalues $\{\lambda_1, \lambda_2, \ldots, \lambda_r\}$ The principal components of X are the eigenvectors of $X^T X$ $\sigma_i = \sqrt{\lambda_i}$ are positive real and termed singular values $\{\hat{u}_1, \hat{u}_2, \ldots, \hat{u}_r\}$ is the set of orthonormal N×1 vectors defined by $$\hat{u}_i = \frac{1}{\sigma_i} X \hat{v}_i$$

$X\hat{v}_i = \sigma_i \hat{u}_i$ (the "value" form of SVD) where $\|X\hat{v}_i\| = \sigma_i$ $\Sigma$ is N×d and diagonal $\sigma_i$ are called singular values of X. It is assumed that $\sigma_1 \geq \sigma_2 \geq \ldots \geq \sigma_r \geq 0$ (rank ordered).

For N>(r=d), the bottom N-r rows of $\Sigma$ are all zeros which will be removed and the first r rows of $\Sigma$ and the first r columns of U will be kept, thus resulting in decomposition. PCA and SVD are related as follows:

Let $X = U\Sigma V^T$ be the SVD of matrix X and $$C = \frac{1}{N-1} X^T X$$

be its covariance matrix of dimension d×d. The Eigenvalues of C are the same as the right singular vectors of X.

This can be shown with the following proof:

$$X^T X = V\Sigma U^T U\Sigma V^T = V\Sigma\Sigma V^T = V\Sigma^2 V^T$$

$$C = V \frac{\Sigma^2}{N-1} V^T$$

C is symmetric; thus, $C = V \Lambda V^T$. As a result, the eigenvectors of the covariance matrix are the same as the matrix V (right singular vectors) and the eigenvalues of C can be determined from the singular values $$\lambda_i = \frac{\sigma_i^2}{N-1}$$

PCA using EVD and SVD may thus be summarized as follows:

Objective: project the original data matrix X using the largest m principal components, $V = [v_1, \ldots, v_m]$.

1. Zero mean the columns of X.
2. Apply PCA and SVD to find the principal components of X.

PCA:
a. Determine the covariance matrix, $$C = \frac{1}{N-1} X^T X.$$

b. V corresponds to the Eigenvectors of C.

SVD:
a. Determine the SVD of $X = U\Sigma V^T$
b. V corresponds to the right singular vectors.

3. Project the data in an m dimensional space: $Y = XV$

To perform dimension reduction and form a feature vector using PCA, order the eigenvalues from the highest to lowest by value. This ordering places the components in order of significance to the variance of the original data matrix. Then we can discard components of less significance.

For example, we have data of d dimensions and we choose only the first r eigenvectors.

$$\frac{\sum_{k=1}^{r} \lambda_i}{\sum_{k=1}^{d} \lambda_i} = \frac{\lambda_1 + \lambda_2 + \ldots + \lambda_r}{\lambda_1 + \lambda_2 + \ldots + \lambda_r + \ldots + \lambda_d}$$

Feature Vector = $(\lambda_1 \lambda_2 \lambda_3 \ldots \lambda_r)$

Because each PC is orthogonal, each component independently accounts for data variability and the Percent of Total Variation Explained (PTV) is cumulative. PCA offers as many principal components as variables in order to explain all variability in the data. However, only a subset of these principal components is notably informative. Because variability is shifted into leading PCs, many of the remaining PCs account for little variation and can be disregarded to retain maximal variability with reduced dimensionality.

For example, if 99% total variation should be retained in the model for d dimensional data, the first r principal components should be kept such that $$PTV = \frac{\sum_{k=1}^{r} \lambda_k}{\sum_{k=1}^{d} \lambda_k} \geq 0.99$$

PTV acts as the signal to noise ratio, which flattens with additional components. Typically, the number of informative components r is chosen using one of three methods: (1) Kaiser's eigenvalue>1; (2) Cattell's scree plot; or (3) Bartlett test of sphericity.

The amount of variation in redundant data decreases from the first principal component onwards. There are several methods to compute the cut off value for retaining the sufficient number of principal components out of all p components. In an exemplary implementation, the Cattell's scree plot may be used, which plots the eigenvalues in decreasing order. The number of principal components to be kept is determined by the elbow where the curve becomes asymptotic and additional components provide little information. Another method is the Kaiser criterion Kaiser which retains only factors with eigenvalues>1.

With continued reference to FIG. 1, following dimension reduction at step 120 as set forth above, vector quantization is carried out at step 125 to create meaningful observations for the HMMs. Vector quantization (VQ) historically has been used in signal representation to produce feature vector sequences. One of the applications of K-Means is vector quantization, such that information theory terminologies used in VQ are commonly applied. For example, the "code book" represents the set of cluster centroids and "code words" represent the individual cluster centroids. The codebook maps the cluster indexes, also known as "code," to the centroids. A basic VQ can be achieved using K-Means clustering with a goal of finding encoding of vectors which minimizes the expected distortion.

Once the above-described PCA process has been applied to the initial data, it results in the mapping of the data to a new feature space using the principal components. In the newly constructed feature space, VQ (clustering) is achieved by applying a K-means algorithm. The K-means objective function is as follows:

Let $\mu_1, \ldots, \mu_k$ be the K cluster centroid (means).

Let $r_{nk} \in \{0, 1\}$ denote whether point $x_n$ belongs to cluster k.

It minimizes the total sum of distances of each of the points from their cluster centers (total distortion):

$$J(\mu, r) = \sum_{n=1}^{N}\sum_{k=1}^{K} r_{nk}\|x_n - \mu_k\|^2$$

The steps performed by the K-means algorithm are then as follows:
1. Input: N examples $\{x_1, x_2, \ldots, x_n\}$; $(x_n \in R^D)$
2. Initialization: K cluster centers $\mu_1, \ldots, \mu_k$. K can be initialized:
    Randomly initialized anywhere in $R^D$ or
    Randomly take any K examples as the initial cluster centers.
3. Iteration:
    Assign each of example $x_n$ to its closest cluster center:

$$C_k = \{n : k = \arg\min_k x_n - \mu_k^2\}$$

($C_k$ corresponds to the set of examples closest to $\mu_k$)
Recalculate the new cluster centers $\mu_k$ (mean/centroid of the set $C_k$)

$$u_k = \frac{1}{|C_k|}\sum_{n \in C_k} x_n$$

Repeat until convergence is achieved: A simple convergence criteria can be considered where the cluster centers no longer move.

Thus, and by way of summary, K-Means Clustering is an algorithm which attempts to find groups in a given number of observations or data. Each element of the vector $\mu$ refers to the sample mean of its corresponding cluster, x refers to each of the examples, and C contains the assigned class labels. The optimal number of clusters is determined using the Elbow method, which is among the many different heuristics for choosing a suitable K. In accordance with a particular implementation, the K-Means Clustering algorithm is run using different values of K and the heterogeneity is plotted. It operates in such a way that, for different values of K, the heterogeneity is plotted. In general, this measurement decreases when the value of K increases since the size of the clusters decreases. The point where this measurement starts to flatten out (elbow on the plot) corresponds to the optimal value of K.

Figure 2:
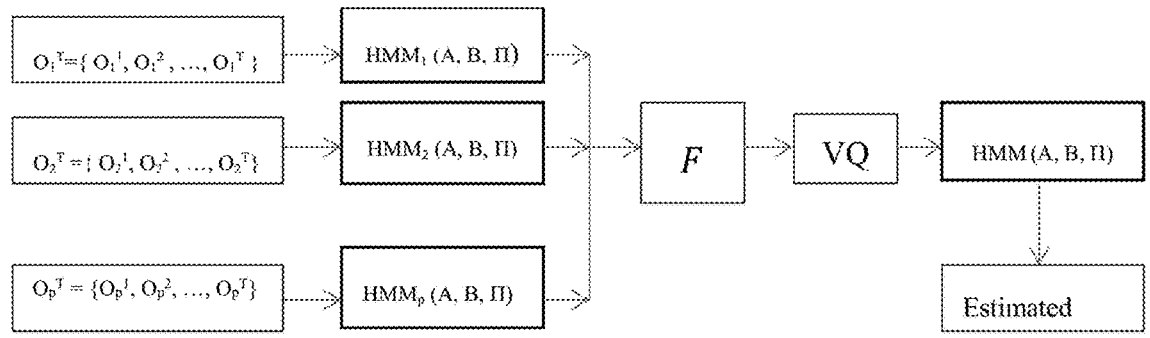
FIG. 2 is a schematic flow chart showing processing carried out by a multi-layer HMM intrusion detection system in accordance with certain aspects of an embodiment of the invention.

As mentioned above, the foregoing data processing steps are carried out in order to provide meaningful observations formatted as data input for one or more training data-generating HMMs (as depicted at step 130 of FIG. 1), which forms the initial step of the multi-layer HMM intrusion detection system and method in accordance with certain aspects of the invention. Such layered HMM is configured to detect multi-stage attacks against a data network. The layering technique can be further extended beyond the specific structure discussed herein (which is summarily depicted in the schematic flow chart of FIG. 2 and discussed in detail below). The layered HMM comprises at least two separate layers of HMMs. Each of those layers, in turn, constitutes two levels: the observation data is used to train the HMMs and estimate the model's parameters at the first level of each layer, and those parameters are used to find the most probable sequence of hidden states at the second level of the same layer. The probable observable state sequences from each of the HMMs are used to construct the training data at Layer 2. It will be used for training the upper layer HMM, which will be able to use the information from the lower layer HMMs to learn new patterns which are not possibly recognized by the lower layer HMMs.

An HMM is a double stochastic process. In other words, it represents two related stochastic processes, including an underlying stochastic process that is not necessarily observable but that can be observed by another set of stochastic processes that produces the sequence of observations. A typical notation for a discrete observation HMM is as follows:

T=observation sequence length
N=number of states in the model
M=number of distinct observation symbols per state
$Q=\{q_1, q_2, \ldots, q_N\}$=distinct "hidden" states of the Markov process
$V=\{v_1, v_2, \ldots, v_M\}$=set of observation symbols per state
$S=\{s_1, s_2, \ldots, s_N\}$=the individual states The HMM is specified by a set of parameters (A, B, Π), and each of the parameters is described below. At time t, $o_t$ and $q_t$ denote the observation and state symbols, respectively.

1. The prior (initial state) distribution $\Pi = \Pi_i$ where $\Pi_i = P(q_1 = s_i)$ are the probabilities of $s_i$ being the first state in a state sequence.
2. The probability of state transition matrix $A = \{a_{ij}\}$ where $a_{ij} = P(q_{t+1} = s_j | q_t = s_i)$, is the probability of going from state $s_i$ to state $s_j$.
3. The observation (emission) transition probability distribution $B = \{b_{ik}\}$ where $b_i(k) = P(o_t = v_k | q_t = s_i)$ is the probability of observing state $s_k$ given $q_t = s_i$.

Conventionally, the HMM model is represented by $\lambda = (A, B, \Pi)$. Given an HMM model, there are three problems to solve. One of the problems, also known as model training, is adjusting the model parameters to maximize the probability of the observation given a particular model, and this is achieved using Baum-Welch algorithm that is a type of Expectation Maximization (EM) (as depicted at step 130 of FIG. 1). This procedure computes the maximum-likelihood estimates, local maxima, of the HMM model parameters (A, B, Π) using the forward and backward algorithms. In other words, for HMM models $\lambda_1, \lambda_2, \ldots, \lambda_n$ and a given sequence of observations $O = o_1, o_2, \ldots, o_t$, we choose $\lambda = (A, B, \Pi)$ such that $P(O|\lambda_i)$, $i = 1, 2, \ldots, n$ is locally maximized.

The model structure of a two-layered HMM configured in accordance with aspects of the invention has a number of hidden states. Given some time granularity of the HMMs, there is a corresponding observation sequence, and a probable sequence of states is established. A new feature vector is constructed from the Layer 1 HMMs' probable sequence of states. This statistical feature can be considered as a new data matrix where VQ can be applied and a new sequence of observations will be created from the Layer 2 HMM:

1. At Layer 1, we have $HMM_1, HMM_2, \ldots, HMM_p$ with their corresponding number of hidden states $S_1, S_2, \ldots, S_p$.
2. Considering the same time granularity (t=T) of each of the HMMs,
    The observation sequence for each of the HMMs are given as:

$$O_1^T = \{O_1^1, O_1^2, \ldots, O_1^T\}, O_2^T = \{O_2^1, O_2^2, \ldots, O_2^T\}, \ldots, O_p^T = \{O_p^1, O_p^2, \ldots, O_p^T\}$$

The probable sequence of states (generated at step 135 of FIG. 1) for each of the HMMs are given as:

$$Q_1^T = \{q_1^1, q_1^2, \ldots, q_1^T\}, \{q_2^1, q_2^2, \ldots, q_2^T\}, \ldots, \{q_p^1, q_p^2, \ldots, q_p^T\}$$

3. A new feature vector is constructed from the Layer 1 HMMs' probable sequence of states. This statistical feature can be considered as a new data matrix where VQ can be applied and a new sequence of observations will be created from the Layer 2 HMM. The feature vector is constructed as follows:

$$f_i = \begin{pmatrix} q_1^i \\ \vdots \\ q_T^i \end{pmatrix}, \forall i = 1, 2, \ldots, p$$

$$F = (f_1, f_2, \ldots f_j), \forall j = 1, 2, \ldots, p$$

The models at Layer 1 and Layer 2 are trained independently to HMM model at Layer 2. Every HMM in each layer constitutes two levels, where the first level determines model parameters and the second level finds the most probable sequence of states. At the first level of Layer 1, given the discrete time sequence of observations, the Baum-Welch algorithm is used for training the outputs of probable sequences. The Baum-Welch algorithm is a type of Expectation Maximization, which computes the maximum log-likelihood estimates, local maxima, of the HMM model parameters using forward and backward algorithms. At the second level of Layer 1 and Layer 2, the Viterbi algorithm is used at step 140 for finding the probable sequences based on the output of learned parameters from the first level of the same layer.

The learning processes carried out by a multi-level HMM method and system configured in accordance with certain aspects of the invention may thus be summarized as follows:

1. Learning at Layer 1:
   Vector Quantization technique using K-Means Clustering is applied on the training dataset; and
   The Baum-Welch algorithm, an Expectation Maximization (EM) algorithm, is used to compute the maximum log-likelihood estimates of the HMM model parameters (A, B, Π).

2. Learning at Layer 2:
   Vector Quantization technique using K-Means Clustering is applied on the training dataset. Here, the training dataset corresponds to matrix F defined above;
   As we have a single HMM at Layer 2, the Baum-Welch method is used to compute the maximum log-likelihood estimates of the HMM model parameters (A, B, Π).

Figure 3:
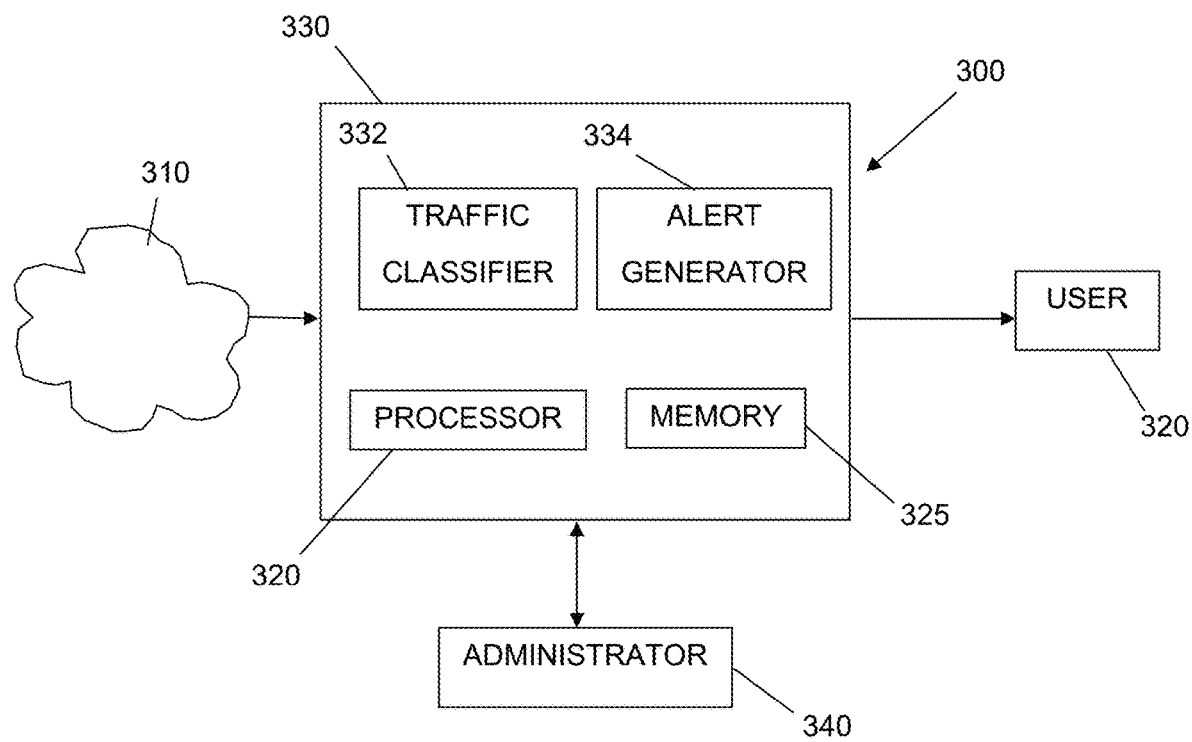
FIG. 3 is a schematic view of an intrusion detection system in accordance with certain aspects of an embodiment of the invention.

FIG. 3 provides a schematic view of an intrusion detection system 300 for implementing the foregoing intrusion detection methods. As shown in FIG. 3, intrusion detection system 300 receives network data packets from a remote source, such as from a distributed wide area network 310, which are intended for transmission to a user 320. Intrusion detection system 300 comprises a processor 320, memory 325, and a network traffic monitor module 330 in data communication with the processor 320 and memory 325. Network traffic monitor module 330 includes a traffic classifier 332 configured to manage the above-described intrusion detection processes, and an alert generator 334 configured to generate an alert for transmission to a network administrator 340. More particularly, when network traffic monitor module 330 determines that there is a pre-defined probability that network traffic from network 310 will define a non-normal state, and more particularly either an anomalous state or an attack state, alert generator 334 may automatically generate and transmit an alert, using any well-known communication protocol as may be deemed suitable to a particular configuration, to a system administrator to enable the system administrator to investigate and, where appropriate, take intervening protective measures to guard the local network of user 320 against intrusion.

EXAMPLES

A multi-layer HMM method configured as described above is simulated to produce the following experimental results. In this simulation, the two HMMs that are considered as the lower layer are HTTP traffic and SSH traffic. The following simulated results reflect each of the processes described above, including dataset analysis using PCA for dimension reduction, K-Means clustering for vector quantization, and finally the results of the LHMM.

Figure 4A:
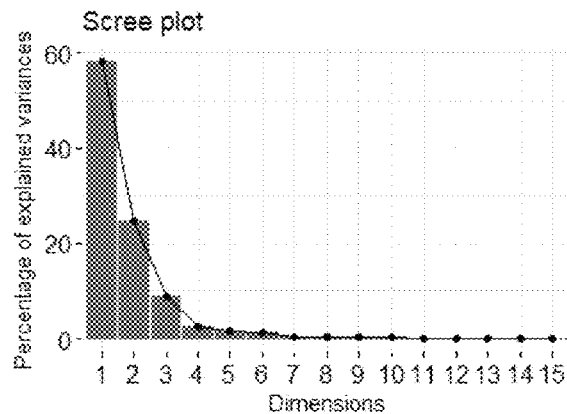
FIG. 4($a$) is a scree plot of the percentage of explained variance during PCA analysis of HTTP network traffic according to certain aspects of the invention.
FIG. 4(b) is a scree plot of eigenvalues from such PCA analysis.
Figure 4B:
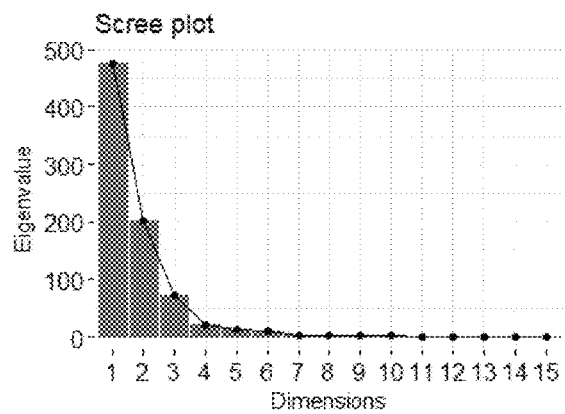

First, PCA analysis is performed on the HTTP traffic data. FIG. 4 shows a scree plot of the dimensions with respect to percentage of explained variance and eigenvalues. The elbow method can be used to determine the number of dimensions to be retained. Equivalently, the cumulative percent of variance with respect to the number of dimensions, as shown in Table 1, can be used to determine the number of dimensions to be retained.

TABLE 1

Principal components with their variance contribution.

| | Eigenvalue | Percent of Variance | Cumulative Percent of Variance |
|---|---|---|---|
| Dim.1 | $4.762758 \times 10^2$ | $5.826067 \times 10^1$ | 58.26067 |
| Dim.2 | $2.011200 \times 10^2$ | $2.460210 \times 10^1$ | 82.86276 |
| Dim.3 | $7.160326 \times 10^1$ | 8.758904 | 91.62167 |
| Dim.4 | $2.027640 \times 10^1$ | 2.480320 | 94.10199 |
| Dim.5 | $1.437619 \times 10^1$ | 1.758575 | 95.86056 |
| Dim.6 | $1.010701 \times 10^1$ | 1.236345 | 97.09691 |
| Dim.7 | 4.111222 | $5.029072 \times 10^{-1}$ | 97.59981 |
| Dim.8 | 4.057777 | $4.963695 \times 10^{-1}$ | 98.09618 |
| Dim.9 | 2.812110 | $3.439927 \times 10^{-1}$ | 98.44018 |
| Dim.10 | 2.672606 | $3.269278 \times 10^{-1}$ | 98.7671 |
| Dim.11 | 1.433143 | $1.753099 \times 10^{-1}$ | 98.94241 |
| Dim.12 | 1.283170 | $1.569643 \times 10^{-1}$ | 99.09938 |
| Dim.13 | 1.226318 | $1.500099 \times 10^{-1}$ | 99.24939 |
| Dim.14 | $9.864789 \times 10^{-1}$ | $1.206715 \times 10^{-1}$ | 99.37006 |
| Dim.15 | $8.110305 \times 10^{-1}$ | $9.920970 \times 10^{-2}$ | 99.46927 |
| Dim.16 | $7.242188 \times 10^{-1}$ | $8.859041 \times 10^{-2}$ | 99.55786 |
| Dim.17 | $6.931104 \times 10^{-1}$ | $8.478506 \times 10^{-2}$ | 99.64264 |
| Dim.18 | $6.044243 \times 10^{-1}$ | $7.393649 \times 10^{-2}$ | 99.71658 |
| Dim.19 | $4.243713 \times 10^{-1}$ | $5.191142 \times 10^{-2}$ | 99.76849 |

For the HTTP traffic, 8 principal components which correspond to 98.09618% of the explained variance are selected from Table 1. Those selected 8 PCs and the first 6 (head) out of the total number of features are shown in Table 2. Each PC is constructed from a linear combination of the total features and their multiplying coefficients specified the table.

TABLE 2

The selected 8 Principal components and head (6 original features displayed here).

|  | PC1 | PC2 | PC3 | PC4 |
|---|---|---|---|---|
| Flow_ID | $7.955283 \times 10^{-3}$ | $1.457065 \times 10^{-2}$ | $1.644281 \times 10^{-3}$ | $3.287887 \times 10^{-1}$ |
| Source_IP | $7.387470 \times 10^{-8}$ | $4.617471 \times 10^{-2}$ | $4.837233 \times 10^{-3}$ | $2.641242 \times 10^{-1}$ |
| Destination_IP | $2.773583 \times 10^{-7}$ | $1.824271 \times 10^{-2}$ | $7.112974 \times 10^{-3}$ | $4.124236 \times 10^{-1}$ |
| Destination_Port | $1.232595 \times 10^{-30}$ | $1.232595 \times 10^{-5}$ | $5.772448 \times 10^{-3}$ | $1.774937 \times 10^{-28}$ |
| Flow.Duration | 1.309048 | 4.731603 | $2.933845 \times 10^{-4}$ | $3.366436 \times 10^{-1}$ |
| Total.Fwd.Packets | $8.387569 \times 10^{-2}$ | $2.23493 \times 10^{-3}$ | $2.357590 \times 10^{-2}$ | $3.209392 \times 10^{-3}$ |

|  | PC5 | PC6 | PC7 | PC8 |
|---|---|---|---|---|
| Flow_ID | $5.998037 \times 10^{-2}$ | $9.81543 \times 10^{-2}$ | $2.131072 \times 10^{-1}$ | $3.108175 \times 10^{-1}$ |
| Source_IP | $2.070467 \times 10^{-2}$ | $2.057702 \times 10^{-2}$ | $2.77837 \times 10^{-30}$ | $6.927052 \times 10^{-1}$ |
| Destination_IP | $2.091758 \times 10^{-4}$ | $5.843059 \times 10^{-2}$ | $1.562471 \times 10^{-1}$ | $2.848223 \times 10^{-1}$ |
| Destination_Port | $8.493351 \times 10^{-30}$ | $2.097338 \times 10^{-29}$ | $1.203706 \times 10^{-29}$ | $4.930381 \times 10^{-30}$ |
| Flow.Duration | 4.514761 | 5.269066 | 9.913239 | $6.871774 \times 10^{-1}$ |
| Total.Fwd.Packets | $3.453238 \times 10^{-2}$ | $1.038723 \times 10^{-1}$ | $6.913426 \times 10^{-1}$ | 4.477584 |

Figure 5A:
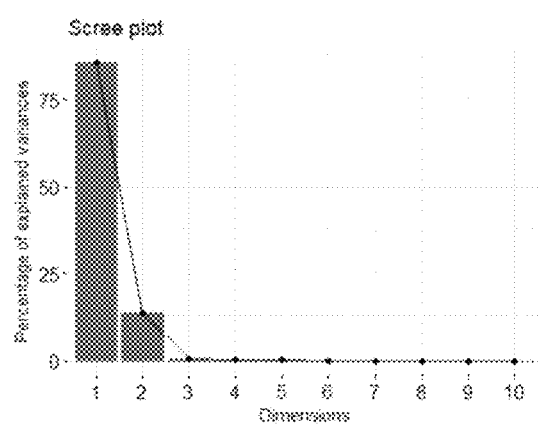
FIG. 5(a) is a scree plot of the percentage of explained variance during PCA analysis of SSH network traffic according to certain aspects of the invention.
Figure 5B:
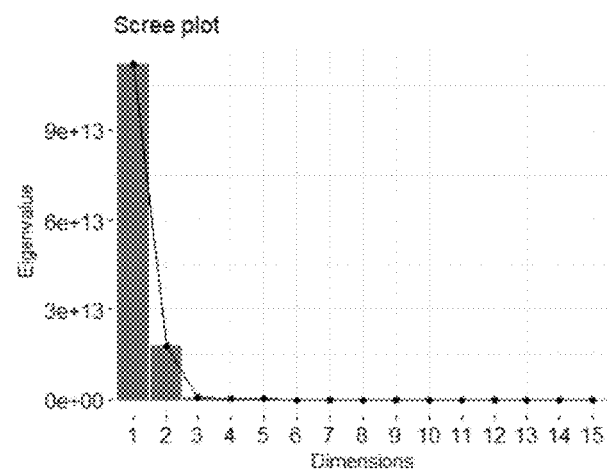
FIG. 5(b) is a scree plot of eigenvalues from such PCA analysis.

Likewise, PCA analysis is performed on the SSH traffic data. FIG. 5 shows a scree plot of the dimensions with respect to percentage of explained variance and eigenvalues. The elbow method can be used to determine the number of dimensions to be retained. Equivalently, the cumulative percent of variance with respect to the number of dimensions, as shown in Table 3, can be used to determine the number of dimensions to be retained.

TABLE 3

Principal components with their variance contribution.

|  | Eigenvalue | Percent of Variance | Cumulative Percent of Variance |
|---|---|---|---|
| Dim.1 | $1.11834 \times 10^{14}$ | $8.53962 \times 10^{1}$ | 85.39622 |
| Dim.2 | $1.77023 \times 10^{13}$ | $1.35175 \times 10^{1}$ | 98.91367 |
| Dim.3 | $6.84686 \times 10^{11}$ | $5.22826 \times 10^{-1}$ | 99.4365 |
| Dim.4 | $4.27484 \times 10^{11}$ | $3.26427 \times 10^{-1}$ | 99.76292 |
| Dim.5 | $2.53906 \times 10^{11}$ | $1.93883 \times 10^{-1}$ | 99.95681 |
| Dim.6 | $2.83901 \times 10^{10}$ | $2.16787 \times 10^{-2}$ | 99.97848 |
| Dim.7 | $1.66896 \times 10^{10}$ | $1.27442 \times 10^{-2}$ | 99.99123 |
| Dim.8 | $6.49554 \times 10^{9}$ | $4.95999 \times 10^{-3}$ | 99.99619 |
| Dim.9 | $3.08202 \times 10^{9}$ | $2.35343 \times 10^{-3}$ | 99.99854 |
| Dim.10 | $1.31229 \times 10^{9}$ | $1.00207 \times 10^{-3}$ | 99.99954 |
| Dim.11 | $3.37909 \times 10^{8}$ | $2.58027 \times 10^{-4}$ | 99.9998 |
| Dim.12 | $1.19652 \times 10^{8}$ | $9.13658 \times 10^{-5}$ | 99.99989 |
| Dim.13 | $5.03480 \times 10^{7}$ | $3.84457 \times 10^{-5}$ | 99.99993 |
| Dim.14 | $3.36857 \times 10^{7}$ | $2.57224 \times 10^{-5}$ | 99.99996 |
| Dim.15 | $2.31915 \times 10^{7}$ | $1.77090 \times 10^{-5}$ | 99.99998 |
| Dim.16 | $1.72495 \times 10^{7}$ | $1.31717 \times 10^{-5}$ | 99.99999 |
| Dim.17 | $1.00092 \times 10^{7}$ | $7.64299 \times 10^{-6}$ | 100 |

For the SSH traffic, 4 principal components which correspond to 99.76292% of the explained variance are selected from Table 3. The first three dimensions of the PCA retains slightly over 99% of the total variance (i.e., information) contained in the data. Those selected 3 PCs and the first 6 (head) out of the total number of features are shown in Table 4.

TABLE 4

The selected 4 Principal components and head (6 original features displayed here).

|  | PC1 | PC2 | PC3 | PC4 |
|---|---|---|---|---|
| Flow_ID | $5.20233 \times 10^{-10}$ | $9.18848 \times 10^{-9}$ | $4.46286 \times 10^{-8}$ | $9.02167 \times 10^{-8}$ |
| Source_IP | $6.00175 \times 10^{-13}$ | $1.93802 \times 10^{-12}$ | $1.48850 \times 10^{-11}$ | $1.77674 \times 10^{-11}$ |
| Destination_IP | $1.23960 \times 10^{-30}$ | 0.00000 | $1.23260 \times 10^{-30}$ | $1.01882 \times 10^{-29}$ |
| Destination_Port | 0.00000 | 0.00000 | 0.00000 | $1.23260 \times 10^{-30}$ |
| Flow.Duration | $3.52624 \times 10^{1}$ | $7.10929 \times 10^{-1}$ | $8.77584 \times 10^{-1}$ | $7.02152 \times 10^{-2}$ |
| Total.Fwd.Packets | $1.22041 \times 10^{-11}$ | $5.02931 \times 10^{-11}$ | $6.34210 \times 10^{-9}$ | $4.41869 \times 10^{-10}$ |

Next, vector quantization is carried out to simplify the dataset from a complex higher dimensional space into a lower dimensional space so that it can be easier for visualization and finding patterns. In this example, it is achieved by using K-Means clustering. To determine the number of clusters (K) in K-Means, the simplest method involves plotting the number of clusters against the within groups sum of squares and find the "elbow" point in the plot. This is similar in concept to the scree plot for PCA discussed above.

Figure 6:
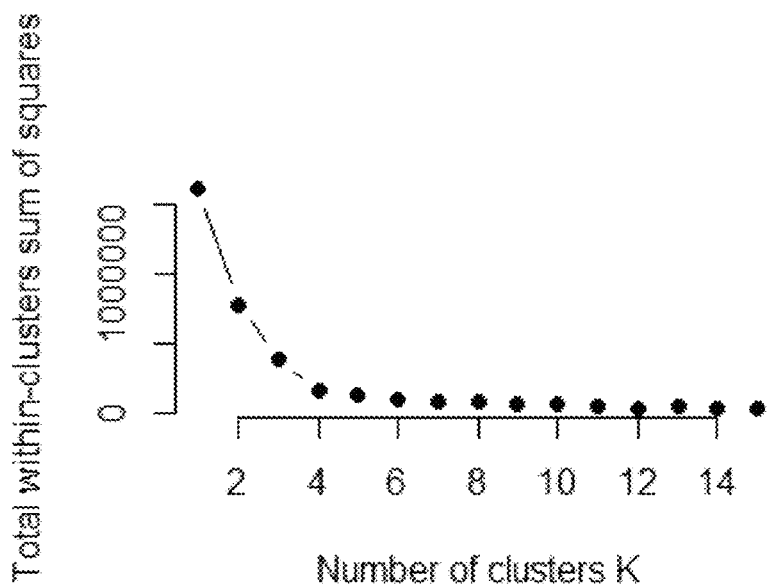
FIG. 6 is a plot showing the within cluster sum of squares versus number of clusters for HTTP traffic.
Figure 7:
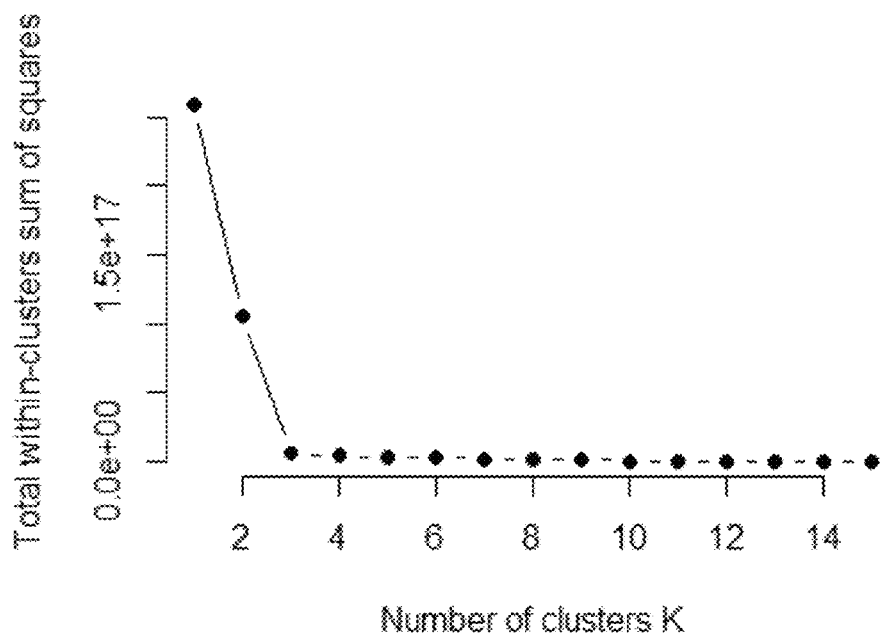
FIG. 7 is a plot showing the within cluster sum of squares versus number of clusters for SSH traffic.

K-Means clustering is applied to the HTTP traffic after PCA, and the number of clusters is determined where the elbow occurs in FIG. 6, which is K=4. The plot shows the within cluster sum of squares (wcss) as the number of clusters (K) varies. Likewise, clustering is applied on the SSH traffic after PCA, and the number of clusters is determined where the elbow occurs in FIG. 7, which is K=3.

The simulated lower layer HMMs are then trained using the corresponding training data and the optimized model parameters are determined using the Baum-Welch algorithm. For HTTP HMM training, the HMM model parameters (A, B, Π) after training are as shown below:

$$A = \begin{bmatrix} 0.9827 & 0.0173 \\ 0.0140 & 0.9860 \end{bmatrix}$$

$$B = \begin{bmatrix} 0.3088 & 0.0973 & 0.2007 & 0.3932 \\ 0.0000 & 0.8129 & 0.0952 & 0.0919 \end{bmatrix}$$

$$\pi = \begin{bmatrix} 1 \\ 0 \end{bmatrix}$$

Figure 8:
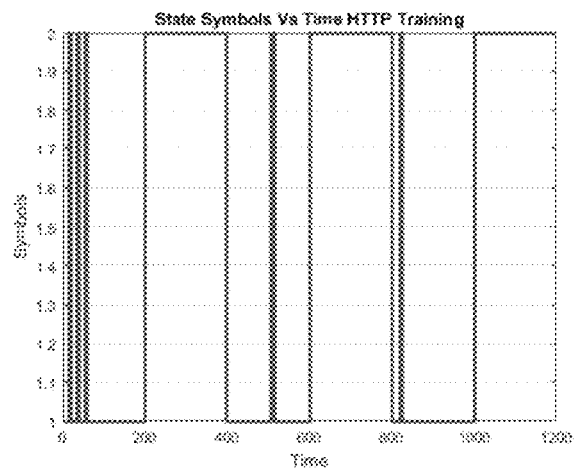
FIG. 8 is a graph of state symbols against time series for exemplary HTTP training data.

The number of hidden states in the HTTP training traffic is shown in Table 5. The corresponding state symbols sequence is plotted against the HTTP training data in FIG. 8.

TABLE 5

Hidden State Symbols of the HTTP traffic.

| State Symbols | HTTP |
|---|---|
| 1 | HTTP–BENIGN |
| 2 | HTTP-Web-attack-bruteforce |

Likewise, SSH HMM training, the HMM model parameters (A, B, Π) after training are as shown below:

$$A = \begin{bmatrix} 0.9772 & 0.0228 \\ 0.0308 & 0.9692 \end{bmatrix}$$

$$B = \begin{bmatrix} 0.6135 & 0.1518 & 0.2348 \\ 0.5092 & 0.2482 & 0.2427 \end{bmatrix}$$

$$\pi = \begin{bmatrix} 1 \\ 0 \end{bmatrix}$$

Figure 9:
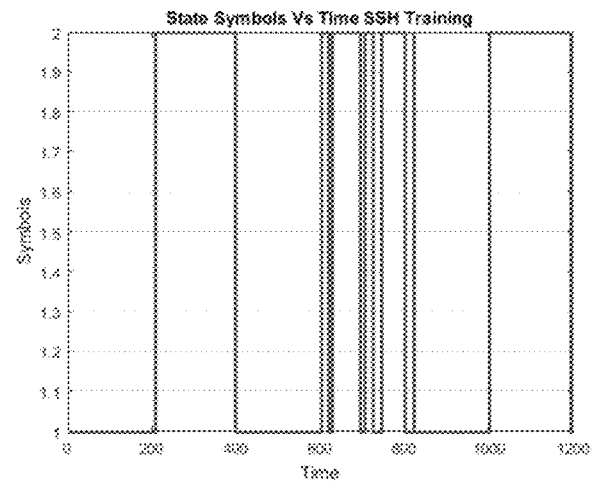
FIG. 9 is a graph of state symbols against time series for exemplary SSH training data.

The number of hidden states in the SSH traffic is shown in Table 6. The corresponding state symbols sequence is plotted against the SSH training data in FIG. 9.

| State Symbols | SSH |
|---|---|
| 1 | SSH-BENIGN |
| 2 | SSH-Patator |

Following the training of the lower layer HMMs, the HMM model parameters (A, B, Π) after training of the upper layer HMM were found to be:

$$A = \begin{bmatrix} 0.9860 & 0.0000 & 0.0000 & 0.0000 & 0.0140 \\ 0.0011 & 0.8962 & 0.0026 & 0.0988 & 0.0014 \\ 0.0000 & 0.2557 & 0.2870 & 0.4240 & 0.0334 \\ 0.0255 & 0.7642 & 0.0024 & 0.1401 & 0.0678 \\ 0.0568 & 0.0105 & 0.0684 & 0.0007 & 0.8636 \end{bmatrix}$$

$$B = \begin{bmatrix} 0.0000 & 1.0000 & 0.0000 & 0.0000 \\ 1.0000 & 0.0000 & 0.0000 & 0.0000 \\ 0.9996 & 0.0000 & 0.0004 & 0.0000 \\ 1.0000 & 0.0000 & 0.0000 & 0.0000 \\ 0.0000 & 0.0000 & 1.0000 & 0.0000 \end{bmatrix}$$

$$\pi = \begin{bmatrix} 1 \\ 0 \\ 0 \\ 0 \\ 0 \end{bmatrix}$$

Figure 10:
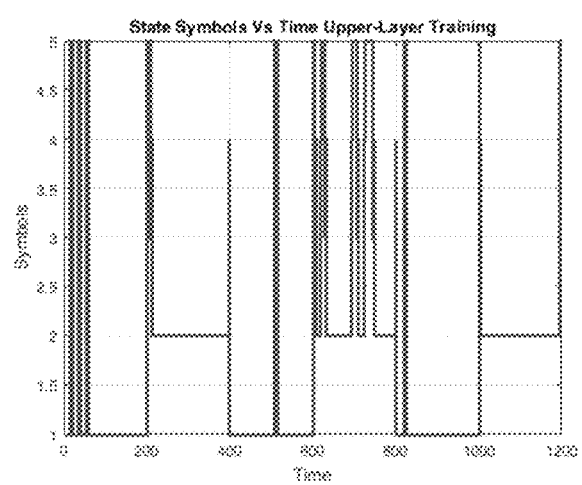
FIG. 10 is a graph of state symbols against time series for exemplary upper level training data.

The hidden states in the upper layer HMM training traffic are shown in Table 7. The corresponding state symbols sequence is plotted against the upper layer HMM training data in FIG. 10.

TABLE 7

Hidden State Symbols of the Upper layer in the training data.

| State Symbols | HTTP | SSH |
|---|---|---|
| 1 | HTTP-BENIGN | SSH-BENIGN |
| 2 | HTTP-Web-attack-bruteforce | SSH-Patator |
| 3 | HTTP-Web-attack-bruteforce | SSH-BENIGN |
| 4 | HTTP-Web-attack-bruteforce | SSH-Patator |
| 5 | HTTP-BENIGN | SSH-Patator |

Figure 11:
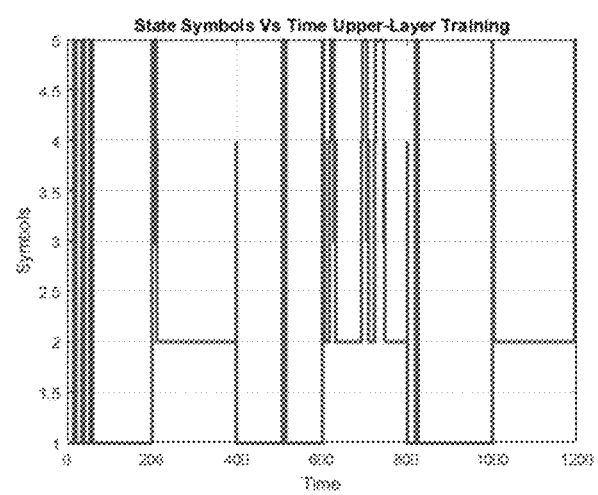
FIG. 11 is a graph of state symbols against time series for exemplary HTTP test data.

Next, the sequence of network states during testing are determined using the Viterbi algorithm, which uses as input the model parameters that are determined during the training phase. During testing of the HTTP HMM, the hidden states of the HTTP HMM shown in Table 8 are similar to the training phase hidden states. The corresponding state symbol sequences are plotted with the HTTP testing data in FIG. 11.

TABLE 8

Hidden State Symbols of the HTTP traffic during testing.

| State Symbols | HTTP |
|---|---|
| 1 | HTTP-BENIGN |
| 2 | HTTP-Web-attack-bruteforce |

Figure 12:
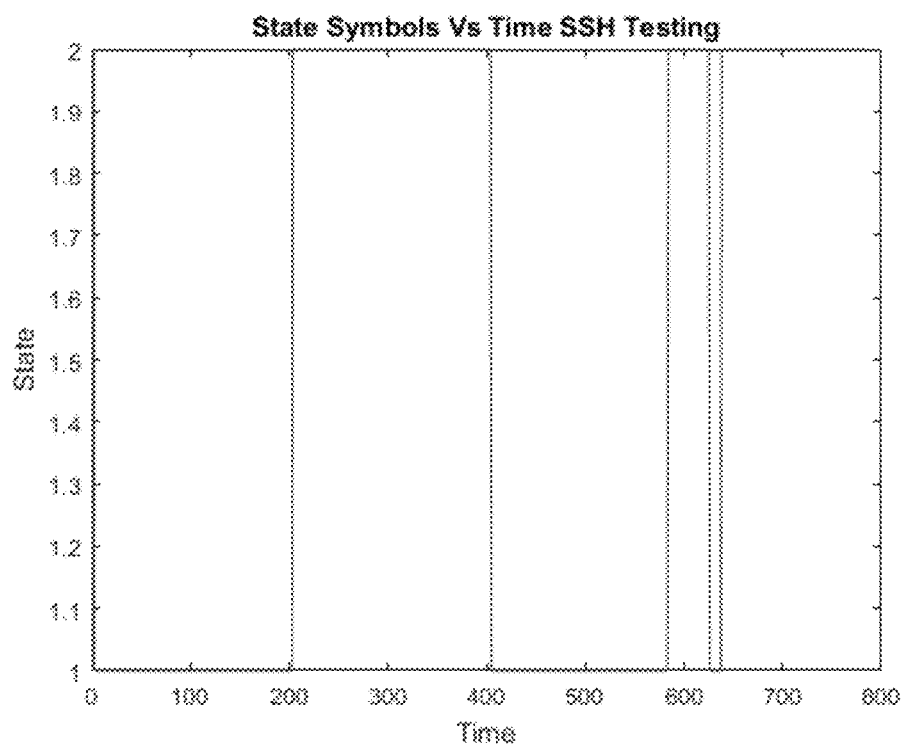
FIG. 12 is a graph of state symbols against time series for exemplary SSH test data.

Similarly, the SSH HMM hidden state symbols are the same as the SSH training data hidden states as shown in Table 9. These state symbols are plotted against a time series data of the testing data as shown in FIG. 12.

TABLE 9

Hidden State Symbols of the SSH traffic in testing data.

| State Symbols | SSH |
|---|---|
| 1 | SSH-BENIGN |
| 2 | SSH-Patator |

Figure 13:
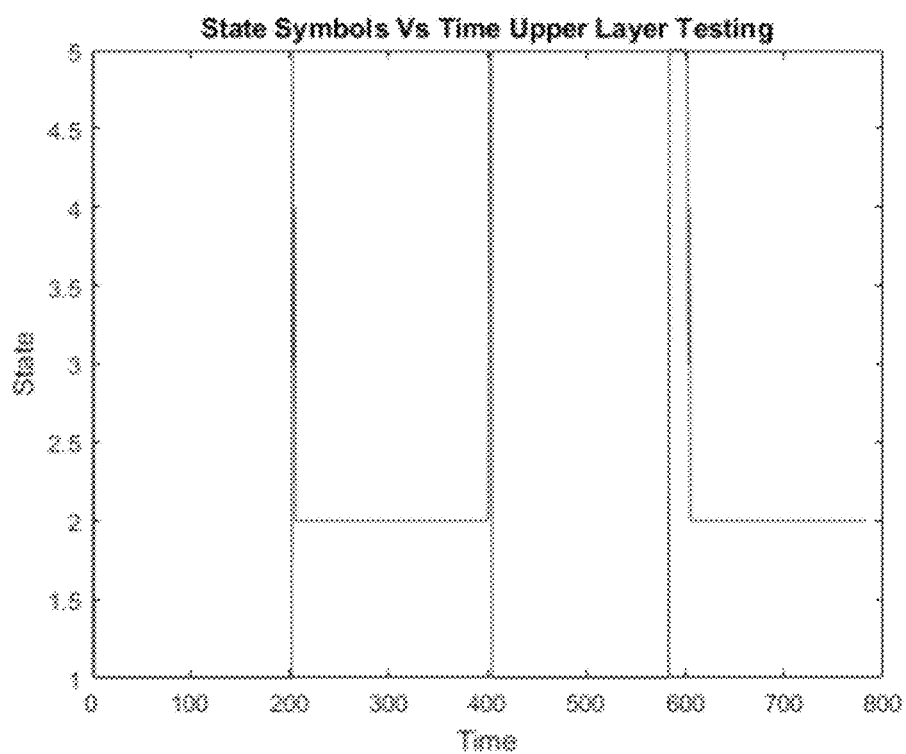
FIG. 13 is a graph of state symbols against time series for exemplary upper level test data.

Next, the upper layer HMM testing hidden states are shown in Table 10 and constitute the hidden states of the lower HMMs. Final results shown in FIG. 13 (showing state symbols plotted against a time series of the upper layer test data) prove the validity of the multi-layer HMM in determining the hidden states within the IDS detection engine.

TABLE 10

Hidden State Symbols of the Upper layer testing data.

| State Symbols | HTTP | SSH |
|---|---|---|
| 1 | HTTP-BENIGN | SSH-BENIGN |
| 2 | HTTP-Web-attack-bruteforce | SSH-Patator |
| 3 | HTTP-Web-attack-bruteforce | SSH-BENIGN |
| 4 | HTTP-Web-attack-bruteforce | SSH-Patator |
| 5 | HTTP-BENIGN | SSH-Patator |

The performance of a multi-layer HMM intrusion detection system and method configured in accordance with aspects of the invention may be evaluated by calculating the common performance measures of Accuracy, Sensitivity, Specificity, Precision, Recall, and F-Measure. Those metrics are among the few considered which are commonly used for evaluating IDS performance. The main aspects to consider when measuring such performance are:

True Positive (TP): Number of intrusions correctly detected;

True Negative (TN): Number of non-intrusions correctly detected;

False Positive (FP): Number of non-intrusions incorrectly detected; and

False Negative (FN): Number of intrusions incorrectly detected.

The performance measures of Accuracy, Precision, Recall, and F-measure may be defined as follows:

Accuracy: the proportion of true results (both true negatives and true positives) with respect to the total number:

$$Accuracy = \frac{t_p + t_n}{t_p + t_n + f_p + f_n}$$

Precision: the fraction of the states which were classified as the interesting state (loaded in this case) that are really that state:

$$Precision = \frac{t_p}{t_p + f_p}$$

Recall: the fraction of the interesting states that were correctly predicted as such. It is also referred to as sensitivity:

$$Recall = \frac{t_p}{t_p + f_n}$$

F-measure: a combination of precision and recall and provides the percentage of positively classified incidents that are truly positive:

$$F1 = \frac{2 \times Precision \times Recall}{Precision + Recall}$$

The performance of a multi-level HMM method and system configured as above an employed in the foregoing examples is as follows:

[Accuracy Precision Recall f_measure]=[0.9898 0.9793 1.0000 0.9895]

In comparison to a single-layer HMM, a multi-layered HMM system and method configured in accordance with certain aspects of the invention may provide one or more of the following advantages:

(1) A single layer HMM may have to be trained on a large number of observations space. In this case, the model can be over-fitted when an insufficient amount of training data is used. As the observation space increases, the amount of data needed to train the model well also increases. As a result, it incurs what is commonly referred as the curse of dimensionality. On the contrary, the layers in a layered HMM system and method configured in accordance with certain aspects of the invention are trained over small-dimensional observation spaces which results in more stable models and does not require large amounts of training data.

(2) The lower layer HMMs are defined and trained with their corresponding data as needed.

(3) The second layer HMM is less sensitive to variations in the lower layer features as the observations are the outputs from each of the lower layer HMMs, which are expected to be well trained.

(4) The two layers (lower and upper) are expected to be well trained independently. Thus, we can explore different HMM combination systems. In particular, we can replace the first layer HMMs with models that are more suitable for network traffic data sequences, with the goal of gaining an understanding of the nature of the data being used. The framework is thus easier to improve and interpret individually at each level.

(5) The layered framework in general can be expanded to learn new network traffics that can be defined in the future by adding additional HMMs in the lower layers.

The results thus demonstrate how a Markov Model can capture the statistical behavior of a network and determine the presence of attacks and anomalies based on known normal network behaviors gathered from training data. Using the vector quantization method, we are able to include multiple dimensions of information into the model, and this will be helpful in reducing false positives and determining more attack states in the future. The model can be re-trained to identify new network states based on the robustness of the training data. This is a promising approach because it is extensible.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, a new anomaly detection or zero day attack detection can be achieved using systems and methods configured in accordance with the invention by computing the posterior probability to determine the level of confidence that the new attach belongs to a previously seen attack. Likewise, a large scale IDS configured in accordance with the foregoing description may be achieved by running the HMM parameter computations on a distributed cloud resource or mainframe computers rented for the computing resources. Still further, the foregoing layered framework in general may be expanded to learn new network traffic that can be defined in the future by adding additional HMMs in the lower layers. It should be understood, therefore, that the invention may be practiced otherwise than as specifically set forth herein.

What is claimed is:

1. A method of protecting a computer network against unauthorized intrusion, comprising the steps of:
receiving network packet data at a processor of a computer-implemented network traffic monitor module;
applying at said processor data normalization to said network packet data, said data normalization comprising applying log-normalization to said network packet data;
generating at said processor meaningful Hidden Markov Model ("HMM") observations formatted as data input for one or more first HMM's, said one or more first HMM's forming a first processing layer of HMM's;
generating from said first processing layer of HMM's a first probable sequence of network traffic states;

processing at said processor said first probable sequence of network traffic states to form a feature vector;

processing at said processor said feature vector to generate meaningful HMM observations formatted as data input for a second HMM, said second HMM forming a second processing layer;

generating from said second processing layer a second probable sequence of network traffic states; and upon determining that said second probable sequence of network traffic states exhibits a designated probability of a non-normal data traffic state, generating an alert of a likely non-normal data traffic state and transmitting said alert to an administrator.

2. The method of claim 1, said step of generating from said first processing layer of HMM's a first probable sequence of network traffic states to form a feature vector further comprising:

processing at said processor said observations formatted as data input for said one or more first HMM's as HMM training data using a vector quantization algorithm;

applying at said processor a Baum-Welch algorithm to compute maximum-likelihood estimates of HMM model parameters for each of said one or more first HMM's; and forming said feature vector as a data matrix comprising said maximum-likelihood estimates of HMM model parameters.

3. The method of claim 2, said step of generating from said second processing layer a second probable sequence of network traffic states further comprising:

processing at said processor said feature vector using a vector quantization algorithm; and applying at said processor a Baum-Welch algorithm to compute maximum likelihood estimates of HMM model parameters for said second HMM.

4. The method of claim 1, wherein said maximum likelihood estimates of HMM model parameters for said second HMM are not recognizable in said first probable sequence of network traffic states.

5. The method of claim 1, wherein said first probable sequence of network traffic states is defined by:

$$Q_1^T = \{q_1^1, q_1^2, \ldots, q_1^T\}, \{q_2^1, q_2^2, \ldots, q_2^T\}, \ldots, \{q_p^1, q_p^2, \ldots, q_p^T\}; \text{ and}$$

wherein said feature vector is constructed as:

$$f_i = \begin{pmatrix} q_1^i \\ \vdots \\ q_T^i \end{pmatrix}, \forall\, i = 1, 2, \ldots, p$$

$$F = (f_1, f_2, \ldots f_j), \forall\, j = 1, 2, \ldots, p.$$

6. The method of claim 1, further comprising the steps of:

prior to said step of generating meaningful HMM observations formatted as data input for said one or more first HMM's, causing said processor to perform dimension reduction on said network packet data using Principal Component Analysis, and to form one or more feature vectors comprising features exhibiting a designated Percent of Total Variation of said network packet data.

7. The method of claim 6, wherein said step of generating meaningful HMM observations formatted as data input for said one or more first HMM's further comprises applying K-Means clustering on said one or more feature vectors to generate feature cluster labels.

8. A system for protecting a computer network against unauthorized intrusion, comprising:

one or more processors; and one or more memories coupled to said one or more processors, wherein the one or more memories are configured to provide the one or more processors with instructions which when executed cause the one or more processors to:

receive network packet data;

apply data normalization to said network packet data, wherein said data normalization comprises applying log-normalization to said network packet data;

generate meaningful Hidden Markov Model ("HMM") observations formatted as data input for one or more first HMM's, said one or more first HMM's forming a first processing layer of HMM's;

generate from said first processing layer of HMM's a first probable sequence of network traffic states;

process said first probable sequence of network traffic states to form a feature vector;

process said feature vector to generate meaningful HMM observations formatted as data input for a second HMM, said second HMM forming a second processing layer;

generate from said second processing layer a second probable sequence of network traffic states; and upon determining that said second probable sequence of network traffic states exhibits a designated probability of a non-normal data traffic state, generate an alert of a likely non-normal data traffic state and transmit said alert to an administrator.

9. The system of claim 8, wherein said instructions that generate from said first processing layer of HMM's a first probable sequence of network traffic states to form a feature vector are further configured to:

process said observations formatted as data input for said one or more first HMM's as HMM training data using a vector quantization algorithm;

apply a Baum-Welch algorithm to compute maximum-likelihood estimates of HMM model parameters for each of said one or more first HMM's; and form said feature vector as a data matrix comprising said maximum-likelihood estimates of HMM model parameters.

10. The system of claim 9, wherein said instructions that generate from said second processing layer a second probable sequence of network traffic states are further configured to:

process said feature vector using a vector quantization algorithm; and apply a Baum-Welch algorithm to compute maximum likelihood estimates of HMM model parameters for said second HMM.

11. The system of claim 8, wherein said maximum likelihood estimates of HMM model parameters for said second HMM are not recognizable in said first probable sequence of network traffic states.

12. The system of claim 8, wherein said first probable sequence of network traffic states is defined by:

$$Q_1^T = \{q_1^1, q_1^2, \ldots, q_1^T\}, \{q_2^1, q_2^2, \ldots, q_2^T\}, \ldots, \{q_p^1, q_p^2, \ldots, q_p^T\}; \text{ and}$$

wherein said feature vector is constructed as:

$$f_i = \begin{pmatrix} q_1^i \\ \vdots \\ q_T^i \end{pmatrix}, \forall\, i = 1, 2, \ldots, p$$

$$F = (f_1, f_2, \ldots f_j), \forall\, j = 1, 2, \ldots, p.$$

13. The method of claim 8, wherein said instructions are further configured to cause the one or more processors to:
prior to generating meaningful HMM observations formatted as data input for said one or more first HMM's, perform dimension reduction on said network packet data using Principal Component Analysis, and form one or more feature vectors comprising features exhibiting a designated Percent of Total Variation of said network packet data.

14. The method of claim 13, wherein said instructions configured to generate meaningful HMM observations formatted as data input for said one or more first HMM's are further configured to apply K-Means clustering on said one or more feature vectors to generate feature cluster labels.

* * * * *